United States Patent
Yamada et al.

(10) Patent No.: US 9,740,395 B2
(45) Date of Patent: Aug. 22, 2017

(54) ELECTRONIC APPARATUS WITH SENSOR-INTEGRATED DISPLAY DEVICE AND METHOD OF CONTROLLING THE SAME

(71) Applicant: Japan Display Inc., Minato-ku (JP)

(72) Inventors: Jouji Yamada, Tokyo (JP); Hirofumi Nakagawa, Tokyo (JP); Michio Yamamoto, Tokyo (JP); Kohei Azumi, Tokyo (JP); Makoto Hayashi, Tokyo (JP); Hiroshi Mizuhashi, Tokyo (JP); Kozo Ikeno, Tokyo (JP); Yoshitoshi Kida, Tokyo (JP)

(73) Assignee: Japan Display Inc., Minato-ku (JP)

( * ) Notice: Subject to any disclaimer, the term of this patent is extended or adjusted under 35 U.S.C. 154(b) by 83 days.

(21) Appl. No.: 14/211,818

(22) Filed: Mar. 14, 2014

(65) Prior Publication Data

US 2014/0292687 A1    Oct. 2, 2014

(30) Foreign Application Priority Data

Mar. 29, 2013    (JP) .................................. 2013-073867

(51) Int. Cl.
*G06F 3/0488* (2013.01)
*G06F 3/041* (2006.01)
(Continued)

(52) U.S. Cl.
CPC ............ *G06F 3/0488* (2013.01); *G06F 3/039* (2013.01); *G06F 3/0412* (2013.01);
(Continued)

(58) Field of Classification Search
CPC .......... G06F 3/017; G06F 3/011; G06F 3/041; G06F 3/0412; G06F 3/0416; G06F 3/044;
(Continued)

(56) References Cited

U.S. PATENT DOCUMENTS

| | | | |
|---|---|---|---|
| 6,323,846 B1 * | 11/2001 | Westerman | G06F 3/0235 345/173 |
| 8,355,887 B1 * | 1/2013 | Harding | G06F 3/017 702/158 |

(Continued)

FOREIGN PATENT DOCUMENTS

| | | |
|---|---|---|
| CN | 1605974 A | 4/2005 |
| CN | 1648837 A | 8/2005 |

(Continued)

OTHER PUBLICATIONS

Office Action issued Jul. 21, 2015 in Japanese Patent Application No. 2013-073867 (with English language translation).

(Continued)

*Primary Examiner* — Keith Crawley
(74) *Attorney, Agent, or Firm* — Oblon, McClelland, Maier & Neustadt, L.L.P.

(57) ABSTRACT

According to one embodiment, an electronic apparatus includes a sensor-integrated display device integrally including a display surface and a sensor surface, a data transfer device, an image data generation module, and a processing module. The data transfer device is configured to generate and output three-dimensional information. The image data generation module is configured to generate three-dimensional image data at a plurality of sensing points on the sensor surface based on the three-dimensional information. The processing module is configured to analyze an operation content of a conductor above the sensor surface based on the image data.

8 Claims, 15 Drawing Sheets

(51) Int. Cl.
*G06F 3/039* (2013.01)
*G06K 9/00* (2006.01)

(52) U.S. Cl.
CPC .. *G06F 3/0416* (2013.01); *G06F 2203/04101* (2013.01); *G06K 9/00201* (2013.01); *G06K 9/00335* (2013.01); *G06K 2009/00395* (2013.01)

(58) Field of Classification Search
CPC ........ G06F 3/0488; G06F 2203/04101; G06K 9/00201; G06K 9/00335; G06K 9/00355; G06K 9/00382; G06K 9/00389; G06K 2009/00395
See application file for complete search history.

(56) References Cited

U.S. PATENT DOCUMENTS

| | | | |
|---|---|---|---|
| 2012/0030637 A1* | 2/2012 | Dey ................... | G06F 3/0304 715/863 |
| 2012/0050217 A1 | 3/2012 | Noguchi et al. | |
| 2012/0110662 A1* | 5/2012 | Brosnan ............ | G06K 9/00006 726/19 |
| 2013/0016122 A1* | 1/2013 | Bhatt ................. | G06F 3/04845 345/620 |
| 2013/0057511 A1* | 3/2013 | Shepelev ............ | G06F 3/044 345/174 |
| 2014/0022185 A1* | 1/2014 | Ribeiro .............. | G06F 3/0412 345/173 |
| 2014/0247206 A1* | 9/2014 | Grokop ............. | G06F 1/3287 345/156 |
| 2015/0109242 A1* | 4/2015 | Wei ................... | G06F 3/044 345/174 |

FOREIGN PATENT DOCUMENTS

| | | |
|---|---|---|
| JP | 2008-117371 A | 5/2008 |
| JP | 2010-271779 A | 12/2010 |
| JP | 2011-221607 A | 11/2011 |
| JP | 2012-48295 | 3/2012 |
| JP | 2012-220967 A | 11/2012 |
| KR | 10-2010-0030404 A | 3/2010 |
| KR | 10-2011-0052270 A | 5/2011 |
| TW | 201137668 A1 | 11/2011 |

OTHER PUBLICATIONS

Korean Office Action issued Aug. 31, 2015 in Patent Application No. 10-2014-0034458 (with English Translation).

Combined Taiwanese Office Action and Search Report issued Oct. 22, 2015 in Patent Application No. 103110546 (with English Translation).

Chinese Office Action issued Jun. 22, 2016 in Chinese Application No. 201410155708.4 (with English translation), 17 pages.

* cited by examiner

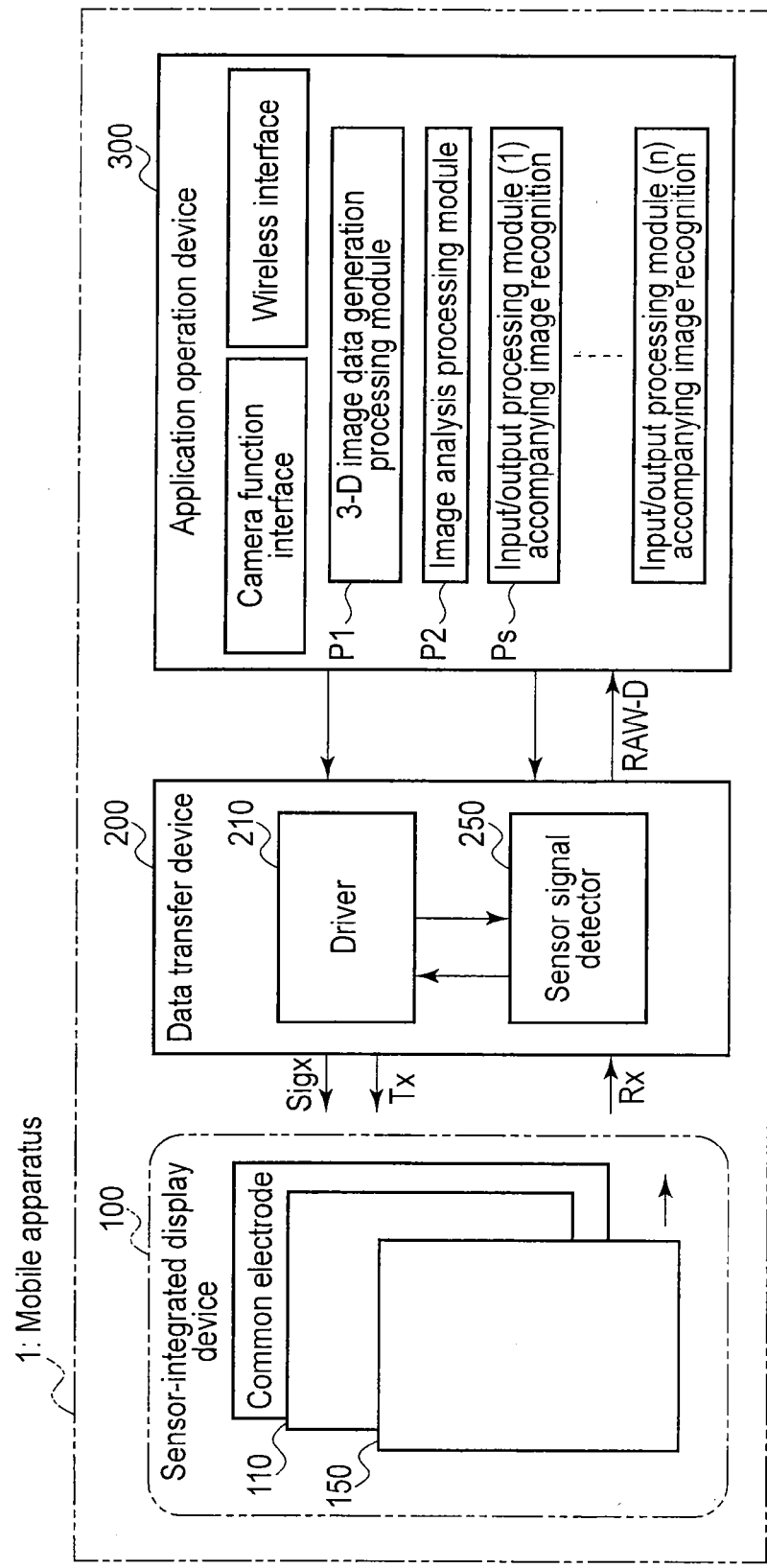
F I G. 1

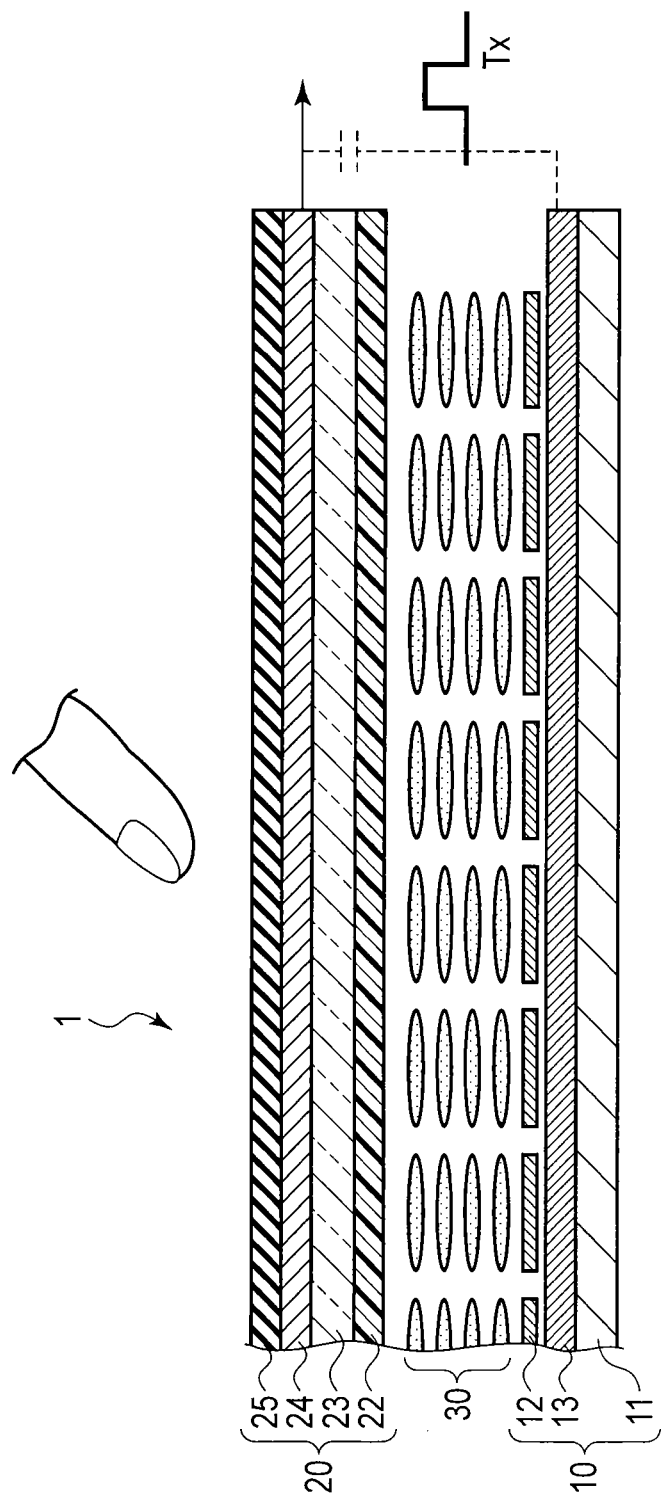
F I G. 2A

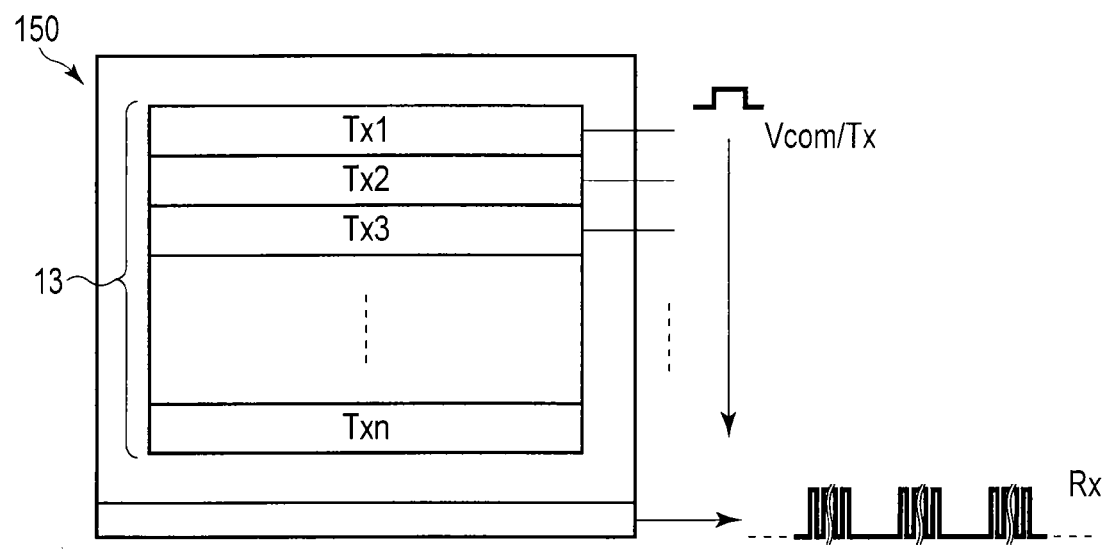
F I G. 5B
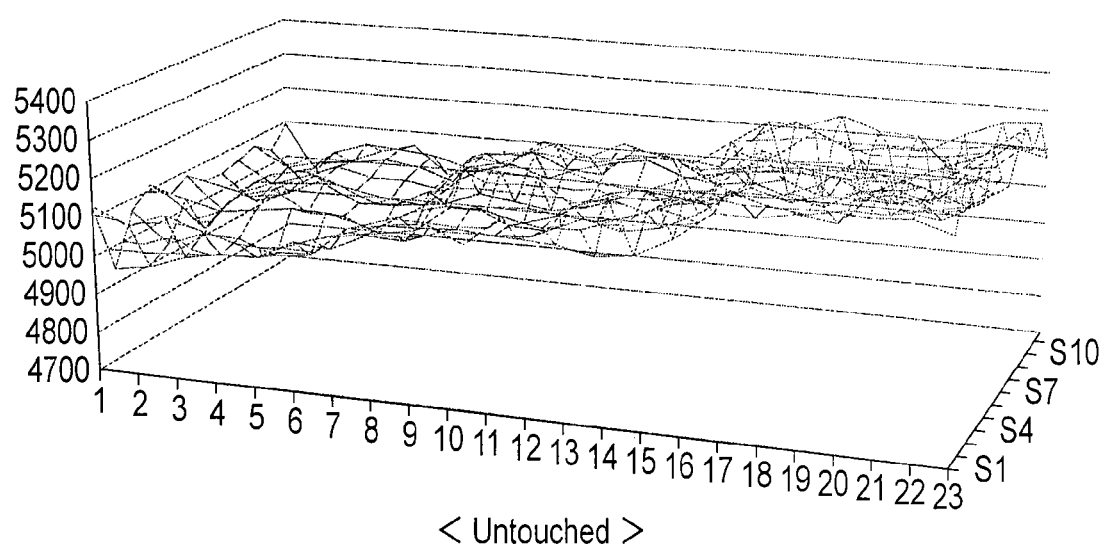
< Untouched >
F I G. 6

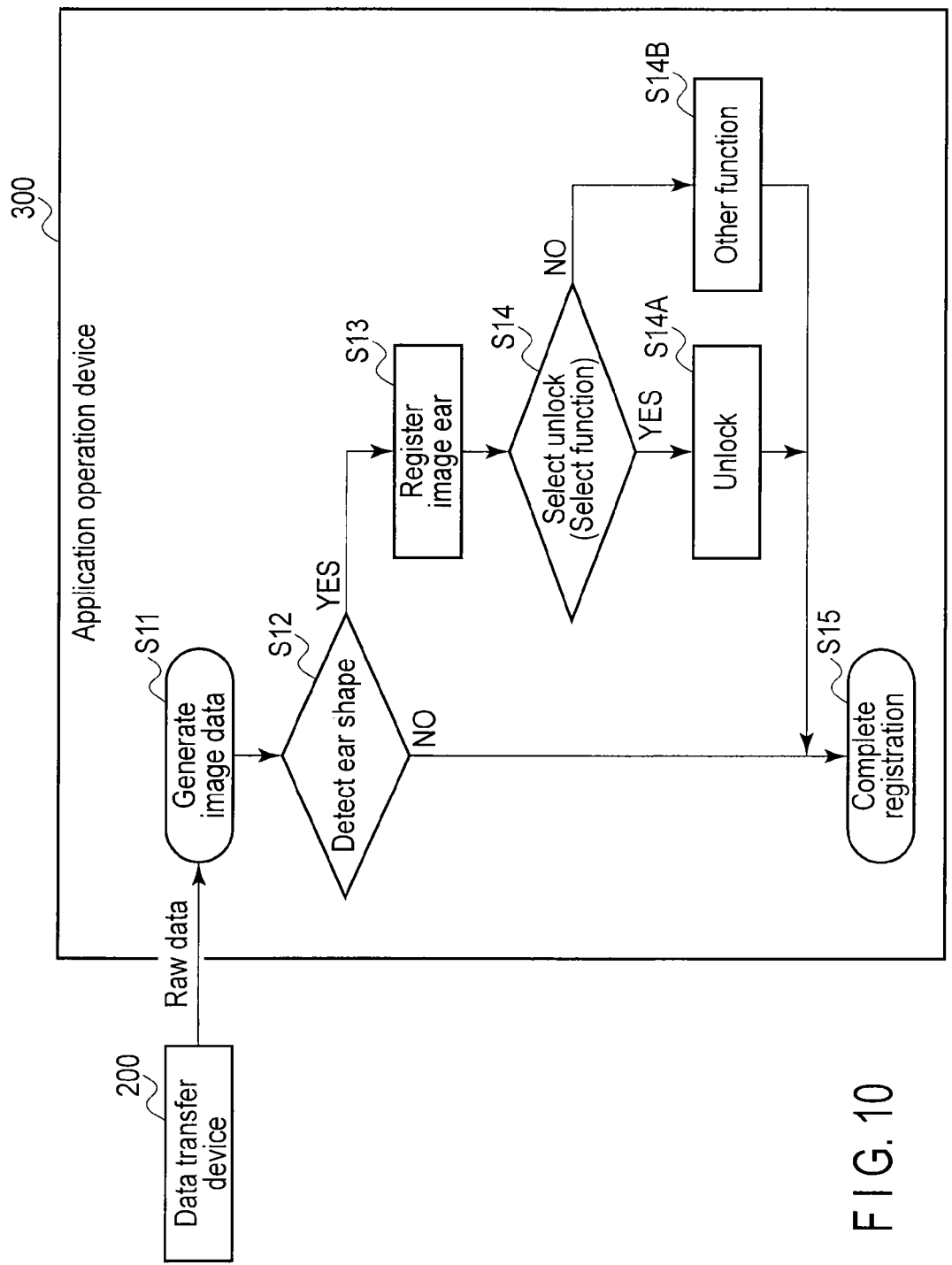
F I G. 10

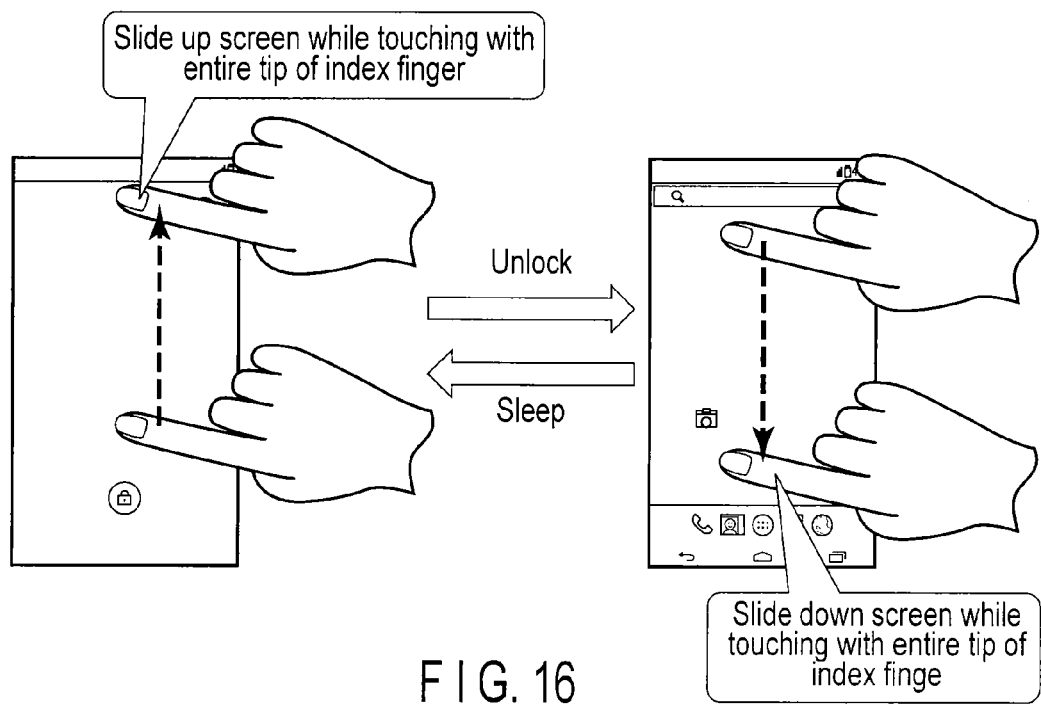
F I G. 16

ELECTRONIC APPARATUS WITH SENSOR-INTEGRATED DISPLAY DEVICE AND METHOD OF CONTROLLING THE SAME

CROSS-REFERENCE TO RELATED APPLICATIONS

This application is based upon and claims the benefit of priority from prior Japanese Patent Application No. 2013-073867, filed Mar. 29, 2013, the entire contents of which are incorporated herein by reference.

FIELD

Embodiments described herein relate generally to an electronic apparatus and a method of controlling the same.

BACKGROUND

Portable information technology devices such as smartphones, tablet computers, personal digital assistants (PDAs), and notebook and netbook computers have become widespread. Such electronic apparatus comprise an operation input panel integrated with a display panel.

When a user touches the display surface, the operation input panel detects the touched position as, for example, a change in capacitance. A detection signal associated exclusively with the operation input panel is input to a touch signal processing integrated circuit (IC). The touch signal processing IC processes the detection signal by means of a programmed algorithm, converts the position touched by the user to coordinate data and outputs the data.

BRIEF DESCRIPTION OF THE DRAWINGS

FIG. 1 is a block diagram of a structure of an electronic apparatus according to an embodiment;

FIG. 2A is a cross-sectional view illustrating a sensor-integrated display device integrally comprising a display surface or a display panel, and an operation surface or an operation input panel;

FIG. 5B is a schematic diagram illustrating a drive status of the sensor detection electrode and a common electrode;

FIG. 6 is a schematic diagram illustrating an example of graphed raw data (detection data) of the sensor output when an operation input is not detected;

FIG. 10 is a flowchart illustrating an example (example 1) of using the mobile apparatus according to the embodiment;

FIG. 16 is an operation diagram for explaining an example (example 5) of using the mobile apparatus according to the embodiment.

DETAILED DESCRIPTION

Figure 2B:
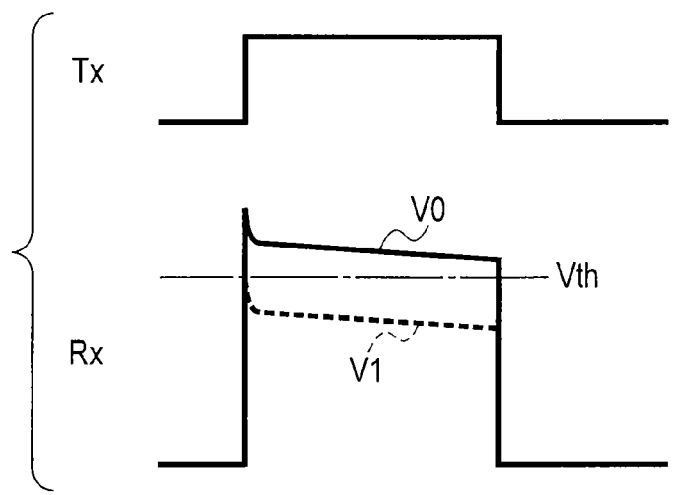
FIG. 2B is a diagram illustrating a principle to acquire a touch detection signal from a signal output from the operation input panel.

In general, according to one embodiment, there is provided an electronic device comprising: a sensor-integrated display device integrally comprising a display surface configured to output display information and a sensor surface configured to input operation information; a data transfer device configured to generate and output three-dimensional information based on a signal sensed at the sensor surface; an image data generation module configured to generate three-dimensional image data at a plurality of sensing points on the sensor surface based on the three-dimensional information output by the data transfer device; and a processing module configured to analyze an operation content of a conductor above the sensor surface based on the image data generated by the image data generation module.

According to another embodiment, there is provided a method of controlling an electronic apparatus comprising a sensor-integrated display device integrally comprising a display surface configured to output display information and a sensor surface configured to input operation information, the method comprising: acquiring three-dimensional information generated based on a signal sensed at the sensor surface; generating three-dimensional image data at a plurality of sensing points on the sensor surface based on the acquired three-dimensional information; recognizing an operation content of a conductor above the sensor surface based on the generated image data; and controlling an application operation in accordance with the recognized operation content.

An embodiment will be described hereinafter with reference to the accompanying drawings.

FIG. 1 shows a mobile apparatus 1 according to the embodiment. The mobile apparatus 1 is an electronic apparatus comprising a sensor-integrated display device 100, a data transfer device 200 and an application operation device 300.

The sensor-integrated display device 100 integrally comprises a display surface for outputting display information and a sensor surface for inputting operation information. The sensor-integrated display device 100 is used as a display device equipped with a sensor. The data transfer device 200 generates and outputs three-dimensional (3-D) information (RAW-D) based on a signal sensed above the sensor surface. The application operation device 300 comprises a processing function of generating 3-D image data at a plurality of sensing points on the sensor surface based on the 3-D information (RAW-D) output by the data transfer device 200, and analyzing an operation content of a conductor above the censor surface based on the generated image data. The application operation device 300 is used as an image data generation module and a processing module.

The sensor-integrated display device 100 integrally comprises the display surface (or a display panel) and an operation surface (or an operation input panel), and therefore comprises a display device component 110 and a sensor component 150.

A display signal (or a pixel signal) is supplied to the sensor-integrated display device 100 from a driver 210 to be described later. When a gate signal is supplied from the driver 210, the pixel signal Sigx is written to pixels of the display device component 100. A voltage between pixel electrode and common electrode is determined in accordance with the pixel signal Sigx, liquid crystal molecules between the electrodes are displaced by the voltage, and brightness corresponding to the displacement of the liquid crystal molecules can be obtained.

The name of the sensor-integrated display device 100 is not limited to this, but may be an input sensor-integrated display module, a user interface or the like.

A liquid crystal display panel, a display module using light-emitting elements such as LEDs or organic electroluminescent (EL) elements may be adopted as the display device component 110. The display device component 110 may be simply called a display. Any of a capacitive variation detection type, a light quantity variation detection type, etc., may be adopted as the sensor component 150. The sensor component 150 may be called a panel for detecting a touch input.

The sensor-integrated display device 100 is connected to the application operation device 300 through the data transfer device 200.

The data transfer device 200 comprises the driver 210 and a sensor signal detector 250. The driver 210 basically inputs graphic data transferred from the application operation device 300 to the display device component 110. The sensor signal detector 250 detects a sensor signal Rx output from the sensor component 150.

The driver 210 and the sensor signal detector 250 operate synchronously with each other. Synchronization control is executed under control of the application operation device 300.

The application operation device 300 is, for example, a semiconductor integrated circuit (LSI) incorporated into an electronic apparatus such as a cellphone, and has a function of compositely executing a plurality of functional processes, for example, web browsing, multimedia processing, etc., by software such as an OS. Such an application processor executes advanced computing processing and may be dual-core or quad-core. An application processor having an operating speed of, for example, 500 MHz or more, preferably 1 GHz is suitable.

The driver 210 supplies the display signal (a signal obtained by performing analog conversion for the graphics data) Sigx to the display device component 110 based on an application. Furthermore, the driver 210 outputs a sensor drive signal Tx for accessing the sensor component 150 based on a timing signal from the sensor signal detector 250. The sensor signal Rx read in synchronization with the sensor drive signal Tx is read from the sensor component 150 and input to the sensor signal detector 250.

The sensor signal detector 250 slices the sensor signal, performs noise reduction for the sliced signal and inputs the noise-reduced signal to the application operation device 300 as raw read image data (which can be called 3-D image data). In the present embodiment, the raw read image data output from the sensor signal detector 250 is called raw data (RAW-D) or raw data except code.

When the sensor component 150 is the capacitive detection type, the image data is not two-dimensional (2-D) data simply indicating coordinates, but can have a multivalue (for example, values of 3 to 7 of 2 or more bits) different according to the capacitance. Therefore, the image data can be called 3-D data including physical quantity and coordinates. Since the capacitance varies in accordance with the distance (proximity) of a target conductor (for example, user's finger) to a touchpanel, the variation can be recognized as a variation of the physical quantity.

The reason why the sensor signal detector 250 of the data transfer device 200 supplies the image data directly to the application operation device 300 as described above is as follows.

First, the application operation device 300 can use the image data for various purposes by making use of its high-speed computing function.

Various new applications are stored in the application operation device 300 in accordance with various needs of a user. The new applications may need a change or switching of a processing method, read timing, a read format, a read range or read density of the image data in accordance with a data processing content.

In this case, when coordinate data alone is received similarly to that in a conventional apparatus, an amount of acquired information is limited. However, when the raw 3-D image data is analyzed similarly to that in the apparatus of the present embodiment, for example, distance information according to the proximity to a conductor can be acquired in addition to coordinate position information.

Furthermore, to obtain expandability of various functions of an application, it is desirable that the data transfer device 200 follows various operations based on control conducted by the application. Thus, the data transfer device 200 is configured to be able to arbitrarily switch read timing, a read range, read density, etc., of the sensor signal in accordance with the control conducted by the application, as the function as simple as possible. This point will be described later.

The application operation device 300 according to the present embodiment is constituted by a single semiconductor integrated circuit called an application processor which is equipped with a baseband engine comprising a wireless interface (FIG. 1) and enables processing of various applications to be executed. The application operation device 300 can also include, for example, a camera function interface besides the wireless interface. Therefore, the application operation device 300 also functions as a coordinate processor module.

Furthermore, the application operation device 300 includes an image data generation processing module (P1), an image analysis processing module (P2) and various application execution modules (Ps). The image data generation processing module (P1) generates 3-D image data at a plurality of sensing points on the sensor surface of the sensor component 150 based on the raw data (RAW-D) from the sensor signal detector 250. The image analysis processing module (P2) recognizes an operation content of a conductor on the sensor surface based on the image data generated in the image data generation processing module. The image analysis processing module (P2) is used as an operation input recognition processing module. The application execution modules (Ps) execute an application according to the operation content recognized in the image analysis processing unit.

FIG. 2A shows a cross-section structure of the sensor-integrated display device 100 into which the display device component 110 and the sensor component 150 are integrated, i.e., a display device into which the display panel and the operation panel are integrated.

A pixel substrate 10 comprises a thin-film transistor (TFT) substrate 11, the common electrode 13 and the pixel electrodes 12. The common electrode 13 is formed above the TFT substrate 11. In the embodiment, the common electrode 13 is formed of a plurality of segments. However, common electrode 13 may be formed with the single electrode. The pixel electrodes 12 are formed above the common electrodes 13 through an insulation layer. The pixel substrate 10 may be called an array substrate. A countersubstrate 20 is placed parallel to the pixel substrate 10. The countersubstrate 20 comprises a color filter 22, a glass substrate 23, sensor detection electrodes 24 and a polarizer 25. The color filter 22, the glass substrate 23, the sensor detection electrodes 24 and the polarizer 25 are placed in the order from a side of a liquid crystal layer 30. The liquid crystal layer 30 is held between the pixel substrate 10 and the countersubstrate 20.

The common electrode 13 serves as common drive electrode for display, and also functions as sensor drive electrode (or common drive electrode for a sensor).

FIG. 2B shows a situation in which a conductor, for example, the user's finger, is in the vicinity of an intersection point the segment of the common electrode and the sensor detection electrode, and a voltage read from the sensor detection electrode located the intersection point changes from V0 to V1. When the finger does not touch the display surface, a current according to the capacitance of the intersection point (hereinafter referred to as a first capacitive element) flows along with charging and discharging with respect to the first capacitive element. A potential waveform of the sensor detection electrode of the first capacitive element is, for example, a waveform V0 in FIG. 2B. When the user's finger approaches the sensor detection electrode, a second capacitive element (capacity) formed by the finger is serially added to the first capacitive element. In this state, a current flows along with charging and discharging with respect to each of the first capacitive element and the second capacitive element. A potential waveform of the sensor detection electrode of the first capacitive element is, for example, a waveform V1 in FIG. 2B, and is detected by the sensor signal detector 250. At this time, the potential of the sensor detection electrode of the first capacitive element is a divided voltage potential determined according to the currents flowing through the first capacitive element and the second capacitive element. Thus, waveform V1 has a smaller value than that of waveform V0 in the non-contact state (or non-approach state). Therefore, whether the finger touches (or approaches) the sensor or not can be determined by comparing the sensor signal Rx with a threshold voltage Vth.

Figure 3:
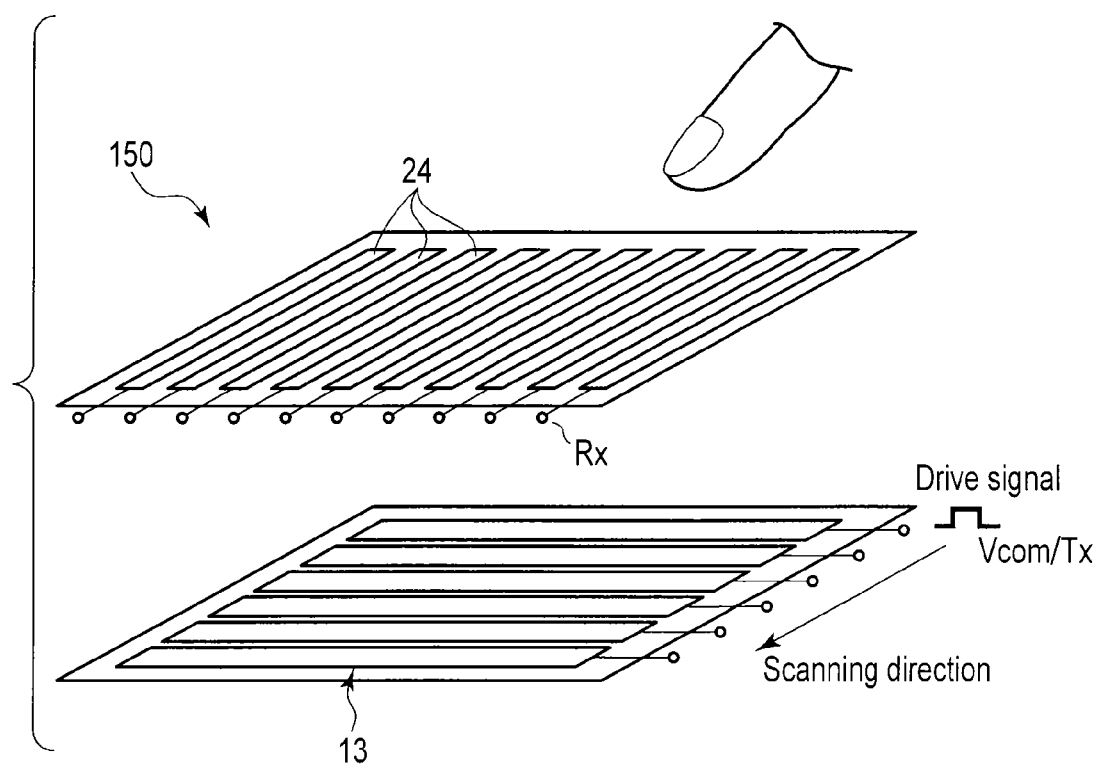
FIG. 3 is a perspective view illustrating a sensor component of the operation input panel and a driving method thereof.

FIG. 3 is a perspective view for illustrating the sensor component of the operation input panel and a method of driving the operation input panel, and shows a positional relationship between the sensor detection electrodes 24 and the common electrode 21 (segments). FIG. 3 is an example, and the sensor component is not limited to this type.

Figure 4:
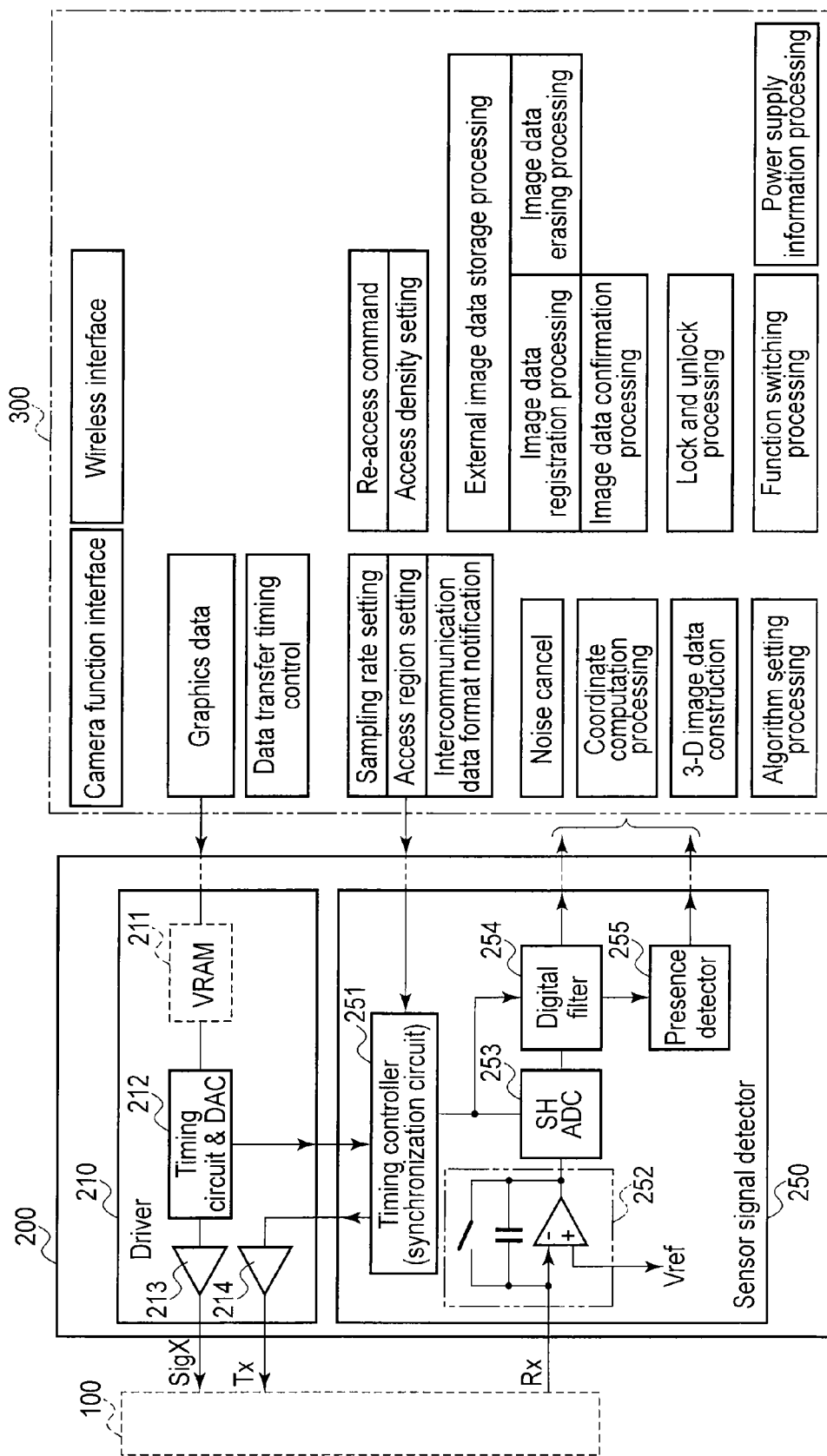
FIG. 4 is a block diagram showing an example of a structure of a data transfer device shown in FIG. 1 and several examples of functions implemented by various applications of an application operation device.

The sensor-integrated display device 100, the data transfer device 200 and the application operation device 300 are also illustrated in FIG. 4.

Here, an example of an inner structure of the data transfer device 200 and the application operation device 300 is further shown.

The data transfer device 200 roughly comprises the driver 210 and the sensor signal detector 250. The names of the driver 210 and the sensor signal detector 250 are not limited to those, but may be a display driver IC and a touch IC, respectively. The driver 210 and the sensor signal detector 250 are separately represented, but may be integrated into a chip.

The driver 210 receives display data from the application operation device 300. The display data is time-divided and comprises a blanking period. The display data is input to a timing circuit and a digital-to-analog converter 212 via a video random access memory (VRAM) 211 serving as a buffer. In this system, capacity of the VRAM 211 may be one frame or less.

The display data Sigx of an analog quantity is amplified by the output amplifier 213 and input to the sensor-integrated display device 100 to be written to the display device. A blanking detection signal detected by the timing circuit and the digital-to-analog converter 212 is input to a timing controller 251 of the sensor signal detector 250. The timing controller 251 may be provided in the driver 210, and may be called a synchronization circuit.

The timing controller 251 generates sensor access pulses for accessing the sensor in the blanking period. The sensor access pulses are amplified by an output amplifier 214 and input to the sensor-integrated display device 100.

The drive signal Tx drives the sensor detection electrodes, and the sensor signal Rx is thereby output from the sensor-integrated display device 100. The sensor signal Rx is input to an integration circuit 252 in the sensor signal detector 250. The sensor signal Rx is compared with a reference voltage (threshold voltage) Vref by the integration circuit 252. The sensor signal Rx of a level greater than or equal to the reference voltage is integrated by a capacitor, integration output is output, and the signal is reset by a switch per detection unit period. An analog output of the sensor signal Rx can be thereby obtained. The output from the integration circuit 252 is input to a sample-and-hold and analog-to-digital converter (SHADC) 253, and digitized. The digitized detection data is input to the application operation device 300 as raw data via a digital filter 254.

The detection data is 3-D data (multivalue data) including both detection data of an operation input and non-detection data of the operation input. A presence detector 255 functions when, for example, the application operation device 300 is in sleep mode and detection of touch coordinates on the operation surface is not executed. If there is an object approaching to the operation surface, the presence detector 255 can sense the approaching object and clear the sleep mode.

The application operation device 300 can receive and analyze the detection data, and output the display data according to a result of the analysis. In addition, the application operation device 300 can switch operation functions of the system.

The application operation device 300 can expand various applications and execute setting an operation procedure of the apparatus, switching the functions, generating and switching the display signal, etc. By using a sensor output (raw data) output from the sensor signal detector 250, the application operation device 300 can perform coordinate processing and analyze an operation position. Since the sensor output is recognized as image data, 3-D image data can be constructed by the application. Registration processing, erasing processing and confirmation processing of 3-D image data can be also performed. Locking and unlocking of operation functions can be performed by comparing registered image data and acquired image data.

When the sensor signal is acquired, the application operation device 300 can also execute varying frequencies of access pulses to the sensor detection electrodes output from the timing controller 251, and setting output timing on the access pulses. The application operation device 300 can thereby execute switching the access range of the sensor component 150 and setting an access rate.

Furthermore, the application operation device 300 can also execute a sampling density of the sensor output signal and addition of additional data to the sensor output signal.

Figure 5A:
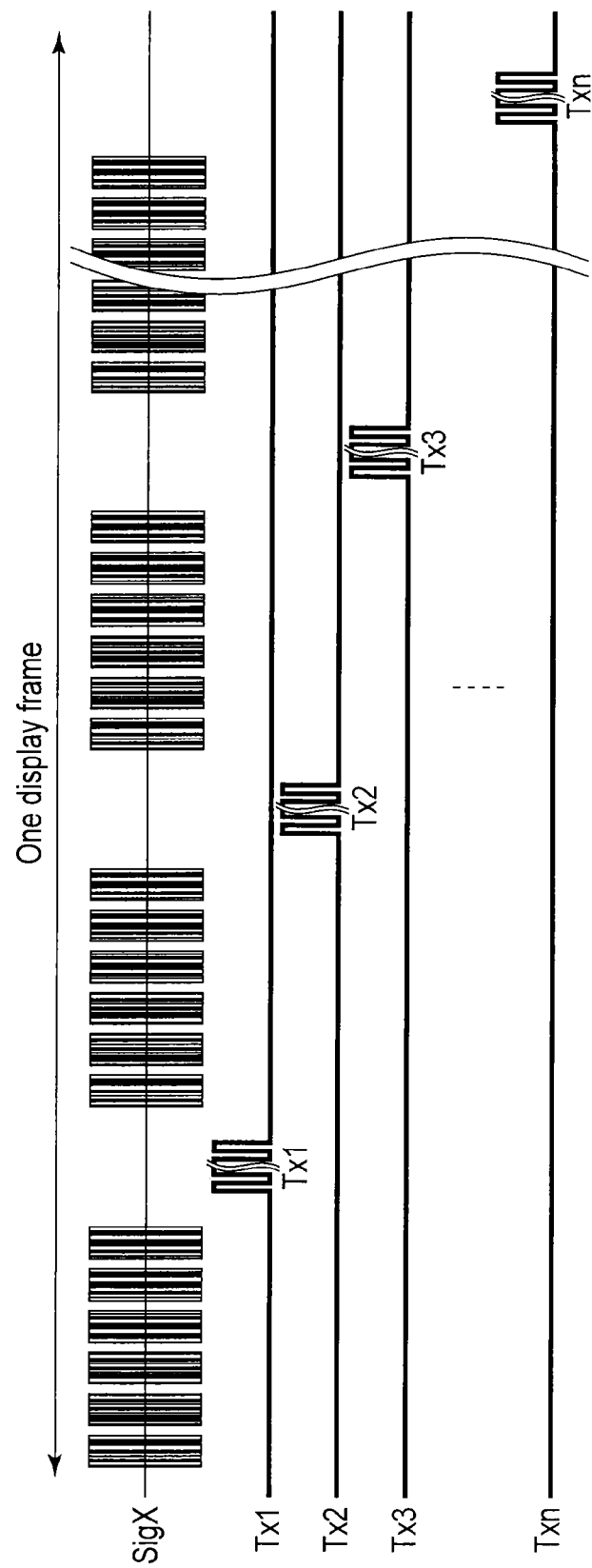
FIG. 5A is a diagram showing an example of output timing of a display signal output from a drive shown in FIG. 1 and FIG. 4 and a drive signal of a sensor detection electrode.

FIG. 5A shows an example of a timing chart of the time-division display data Sigx output from the data transfer device 200 and the sensor drive signal Tx (Tx1-Txn). FIG. 5B shows the sensor component 150 including the common electrode 13 and the sensor detection electrodes, and schematically shows a situation in which a common voltage Vcom and the sensor drive signal Tx perform 2-D scanning. The common voltage Vcom is applied to the segments of the common electrode 13 in order. The drive signal Tx to obtain the sensor output in an arbitrary period is also provided to the segments of the common electrode 13.

The display data Sigx and the sensor drive signal Tx may be input to the driver 210 in time division via the same bus from the application operation device 300. The display data Sigx and the sensor drive signal Tx may be separated in the timing circuit and the digital-to-analog converter 212. The sensor drive signal Tx is supplied to the common electrode 13 (segments) via the timing controller 251 and the amplifier 214. Timing of output of the sensor drive signal Tx from the timing controller 151, a frequency, etc., can be varied by a command of the application operation device 300. The timing controller 251 can supply a reset timing signal to the integration circuit 252 of the sensor signal detector 250, and supply a clock to the sample-and-hold and the analog-to-digital converter 253, and the digital filter 254.

FIG. 6 is an example of the raw data of the sensor output, and shows a schematic diagram of graphed data obtained when the operation input is not detected.

Figure 7:
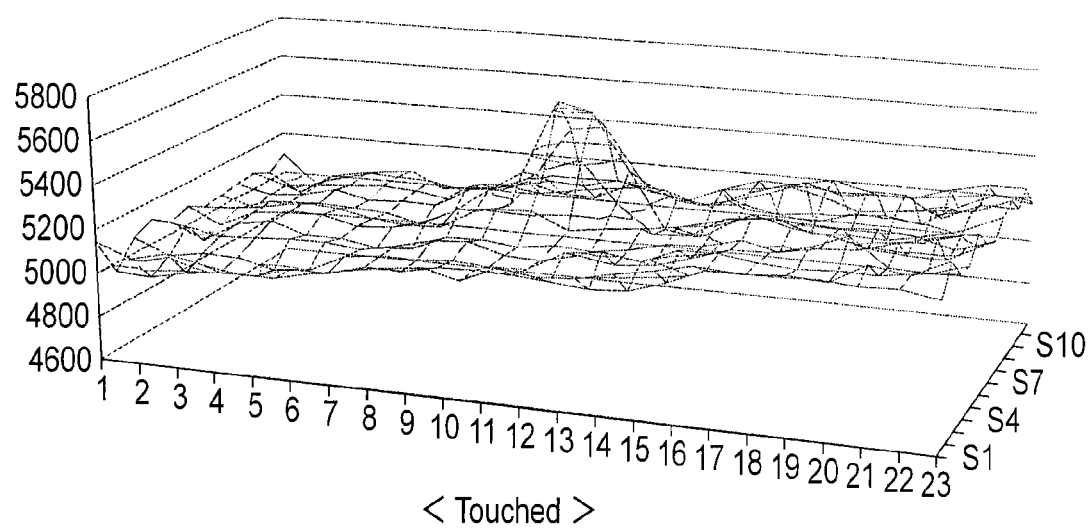
FIG. 7 is a schematic diagram illustrating an example of graphed raw data (detection data) of the sensor output when the operation input is detected.

FIG. 7 is an example of the raw data of the sensor output, and shows a schematic diagram of graphed data obtained when the operation input is detected.

Figure 8:
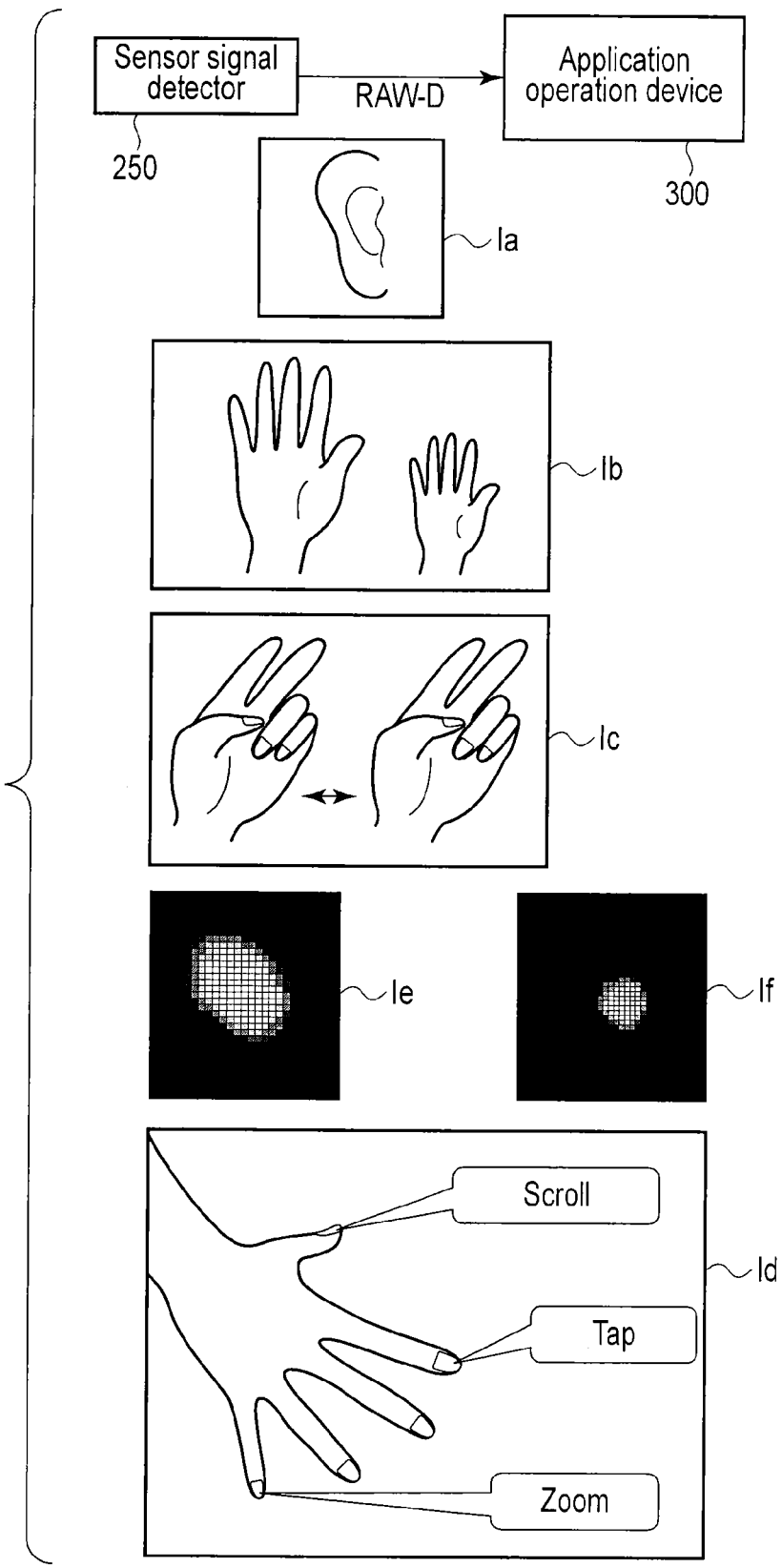
FIG. 8 is a diagram illustrating an example of using a mobile apparatus according to the embodiment.

FIG. 8 shows a concrete example of implementing various types of application operation functions including a multi touch interface function by 3-D image data in the application operation device 300. The 3-D image data is generated based on the raw data (RAW-D) input from the sensor signal detector 250. In the example shown in FIG. 8, various types of operation contents can be recognized above the sensor surface by using the 3-D image data generated based on the raw data (RAW-D). The operation contents are, for example, the shape of the operator's (user's) ear (Ia), the shape of the operator's palm (Ib) in a case in which the operator is an adult, and the shape of the operator's palm (Ib) in a case in which the operator is a child, combination (Ic) of a specific gesture and an operation, an operation (Id) executed by a plurality of finger touches, a state (Ie) in which the tip of a finger touches the sensor surface, a state (If) in which the very end of a finger touches the sensor surface, etc. Various types of control can be executed by image verification if 3-D image data on these recognizable operation contents is registered along with application functions.

For example, the mobile apparatus 1 can recognize the shape of the ear (see Ia), execute determination of authenticity of operator and control other functions if the operator touches the ear to the sensor surface of the mobile apparatus 1. In the determination of authenticity, the mobile apparatus 1 can recognize that the ear is the operator's, and a function lock of the mobile apparatus 1 can be unlocked. In the function control, automatic switching control of functions of the mobile apparatus 1 can be executed. The functions include a function of recognizing that the operator starts a call and switching an operation mode to a call mode (receipt state) if the operator touches his ear to the sensor surface.

By recognizing the size of the palm (see Ib), selective supply of generational application, selective supply of user application, and permission or prohibition of the use of an apparatus or an application of which operator is specified can be performed.

In the combination (see Ic) of a specific gesture and an operation, for example, a camera application is activated and shooting using camera can be performed if two fingers of "peace sign" touch the operation surface for the second time in a row, and a music player is activated and music reproduction can be performed if the two fingers touch the operation surface for the third time in a row.

A plurality of fingers can be used for different functions, respectively (see Id), without switching the operation functions. For example, a scroll operation can be performed by the thumb, a tap operation can be performed by the index finger, and a zoom operation can be performed by the little finger.

The mobile apparatus 1 can distinguish between the touch of the tip of the finger (see Ie) and the touch of the very end of the finger (see If), and activate different applications.

Figure 9:
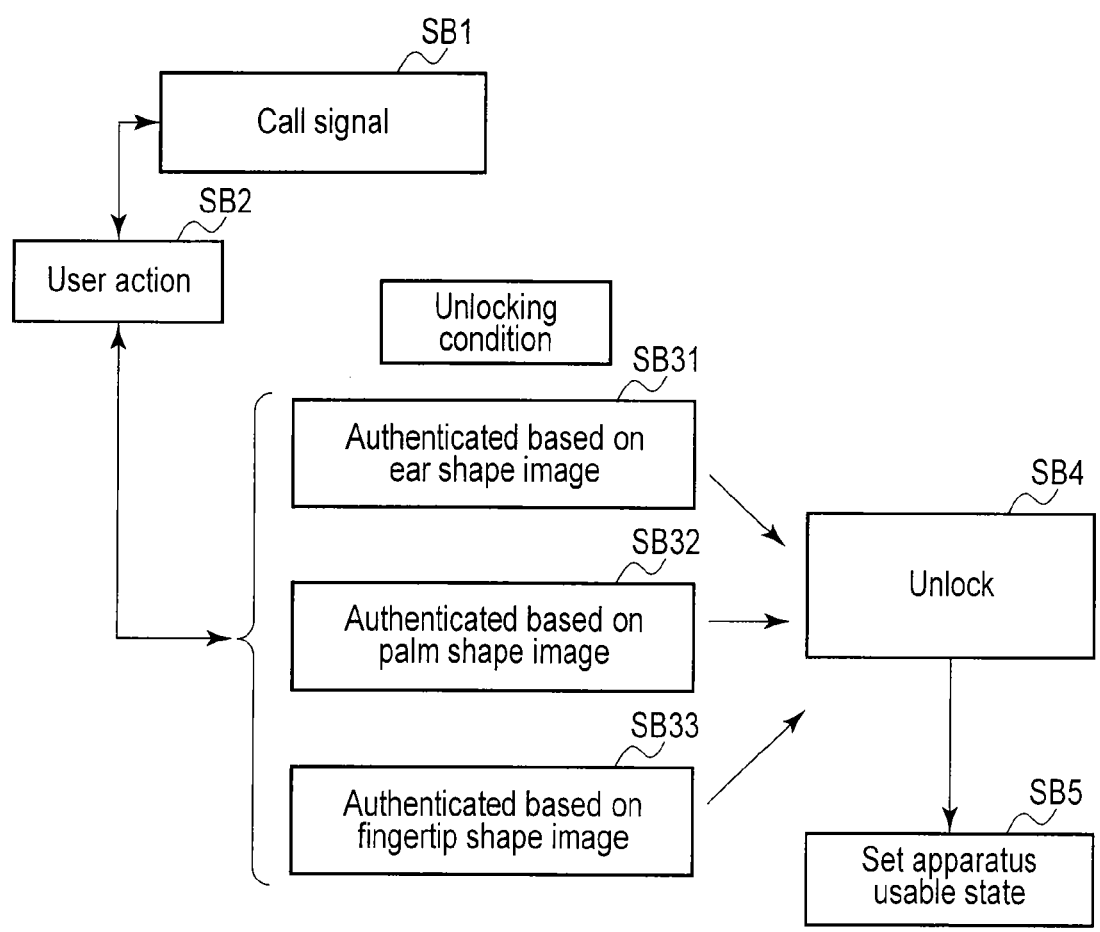
FIG. 9 is a flowchart illustrating an example of using the mobile apparatus according to the embodiment.

FIG. 9 shows an example of the unlocking executed by the recognition of various operation contents in the mobile apparatus 1. The function lock of the mobile apparatus 1 is selectively unlocked (SB4), and the mobile apparatus 1 is enabled (SB5). In this example, a condition for the unlocking is defined by an OR condition or either of AND conditions. If it is the OR condition, the unlocking is conditioned since one of a plurality of events occurs. If it is the AND condition, the unlocking is conditioned since all of the events occur or two or more arbitrary events occur. The event occurs, for example, when the authentication is made by the shape of the ear (SB31), when the authentication is made by the shape of the palm (SB32), and when the authentication is made by the shape of the fingertip (SB33). By the unlocking means, a convenient authentication function according to a security level can be performed.

Registration processing of 3-D image data used for these authentications can be smoothly performed by operation guidance executed by, for example, both or either of an image registration screen and audio guidance.

In the application operation device 300, processing steps for implementing the authentication processing and the image registration processing to implement application functions according to various operation contents based on the 3D image data and processing are preliminarily prepared.

Figure 11:
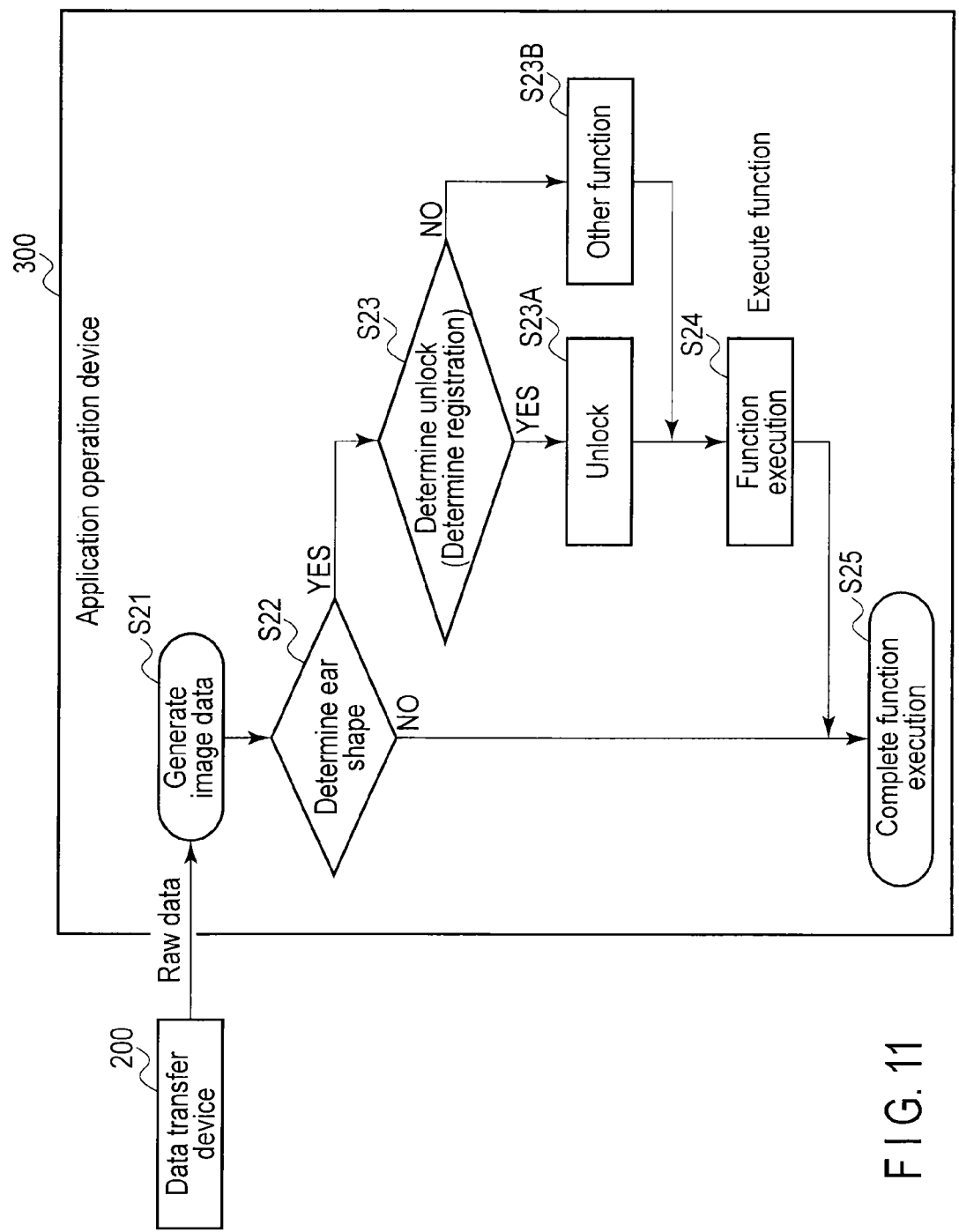
FIG. 11 is a flowchart illustrating the example (example 1) of using the mobile apparatus according to the embodiment.

FIG. 10 and FIG. 11 show processing steps of the registration and the authentication for recognizing the shape of the ear (see Ia) and selectively releasing the function lock of the mobile apparatus 1.

FIG. 10 shows an example of a registration sequence. In the registration sequence, 3-D image data on the ear of the user who possesses the mobile apparatus 1 is registered to an application operating on the application operation device 300 (S11-S13). Next, function selection is executed by using the registered 3-D image data of the ear (S14). If unlocking is selected, unlocking (S14A) is registered and the registration processing of the authentication using the shape of the ear is completed (S15). If unlocking is not selected, the other function (S14B) is used. The registration sequence can be changed in various manners and may be structured to use the other function (S14B) as appropriate.

FIG. 11 shows an example of an unlocking sequence. In the unlocking sequence, the 3-D image data of the ear generated by the touch of the ear on the sensor surface of the sensor component 150 by the user who possesses the mobile apparatus 1 is verified in the application to which the 3-D image data of the ear is preliminarily registered (S21-S22). If the image data is determined to indicate the shape of the ear, registration determination is executed (S23). If unlocking is determined, the lock of the application to which the 3D image data is preliminarily registered is released by the determination of correspondence of features (S23A-S34). If unlocking is not determined, the other function (S23B) is used. The unlocking sequence can be changed in various manners and may be structured to use the other function (S14B) as appropriate.

Figure 12:
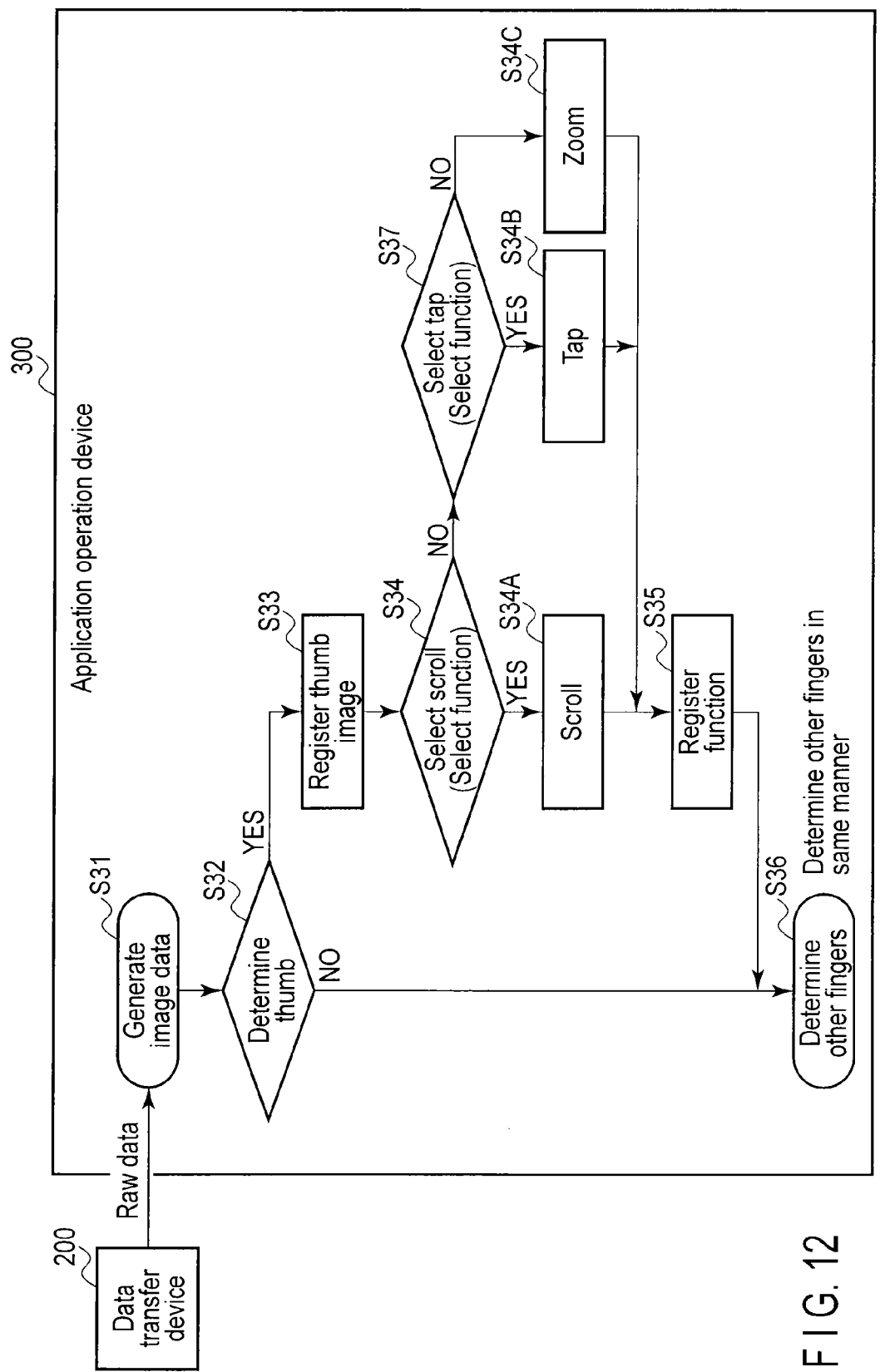
FIG. 12 is a flowchart illustrating an example (example 2) of using the mobile apparatus according to the embodiment.
Figure 13:
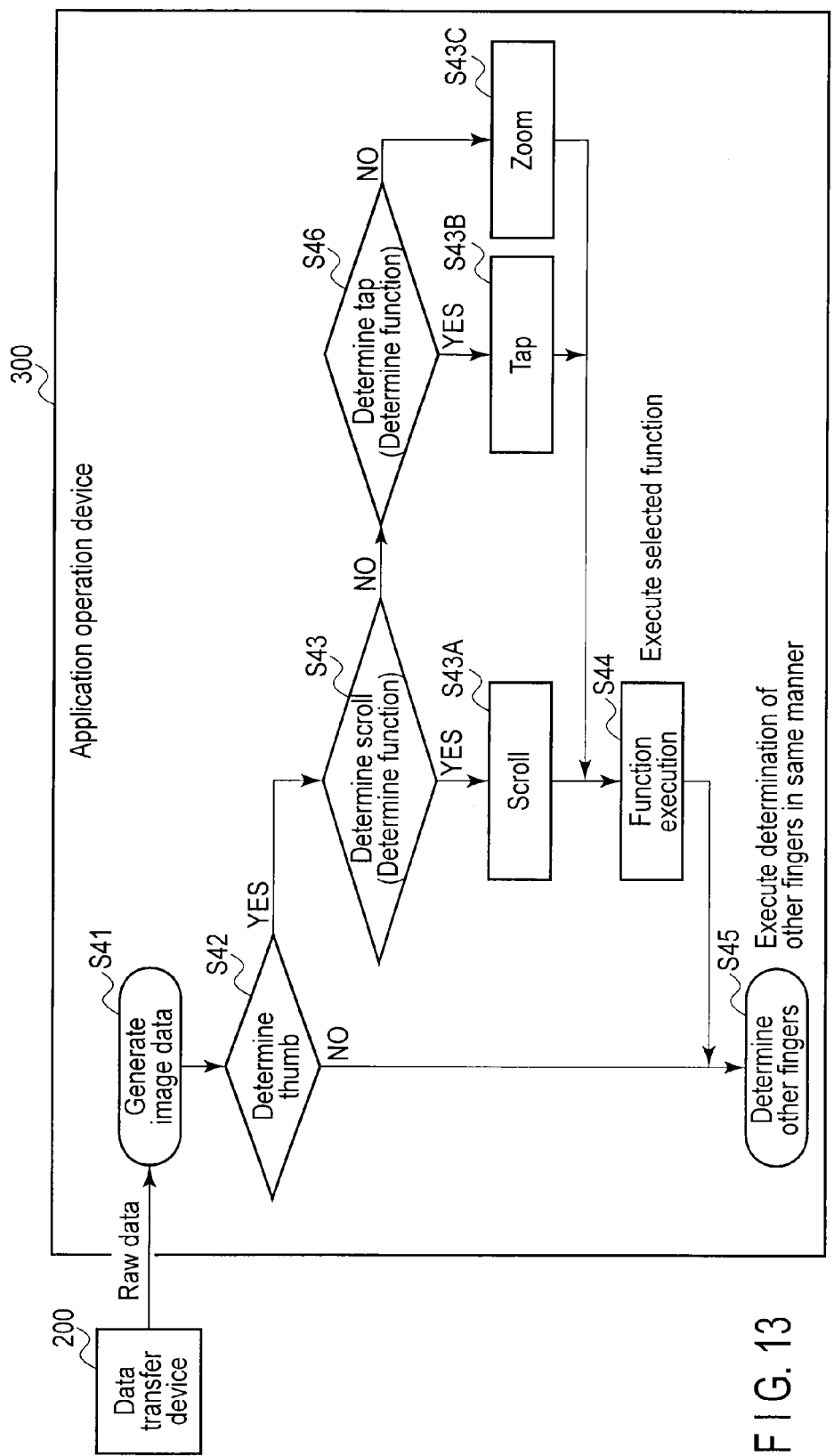
FIG. 13 is a flowchart illustrating the example (example 2) of using the mobile apparatus according to the embodiment.

FIG. 12 and FIG. 13 show processing steps of registration and operations which enable an operation input using a plurality of fingers (see Id).

FIG. 12 shows an example of a registration sequence. In the registration sequence, the shape of each finger used for an operation on the sensor surface is preliminarily registered as 3-D image data. For example, when a scroll operation is performed by the thumb, a tap operation is performed by the index finger and a zoom operation is performed by the little finger, 3-D image data on the thumb is first registered by touching the sensor surface with the thumb (S31-S33), and then an operation function (scroll operation function) of the registered thumb is registered (S34A-S35). Furthermore, 3-D image data on the index finger and an operation function (tap operation function) of the index finger is registered (S34B-S35), and 3-D image data on the little finger and an operation function (zoom operation function) of the little finger is registered (S34C-S35).

FIG. 13 shows an example of an operation sequence. In the operation sequence, image data on a finger touching the sensor surface and the image data on the registered fingers are verified (S43), which enables the scroll operation to be executed by the thumb (S43A-S44), the tap operation to be executed by the index finger (S43B-44) and the zoom operation to be executed by the little finger (S43C-S44), without executing function selection.

Figure 14:
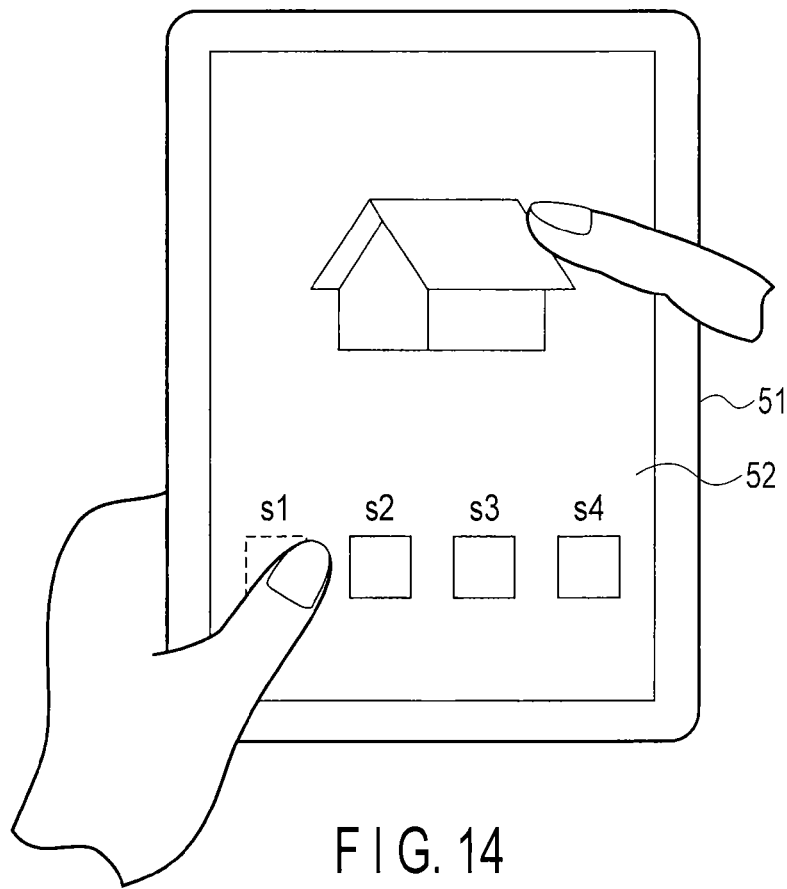
FIG. 14 is an operation diagram for explaining an example (example 3) of using the mobile apparatus according to the embodiment.

FIG. 14 shows an operation example of separately touching two points on the sensor surface and switching the application functions. For example, by selecting a line type function of drawing by the left thumb and touching a drawn portion by the right index finger, a line type of the drawn portion touched by the right index finger can be changed. By selecting a color designation of drawing by the left thumb and touching the drawn portion by the right index finger, a color of the drawn portion touched by the right index finger can be changed. By selecting partial deletion of drawing by the left thumb and touching the drawn portion by the right index finger, the drawn portion touched by the right index finger can be deleted by an eraser function. As described above, since the functions can be switched by operations of a plurality of fingers, a touch operation function having excellent operability can be supplied.

Figure 15:
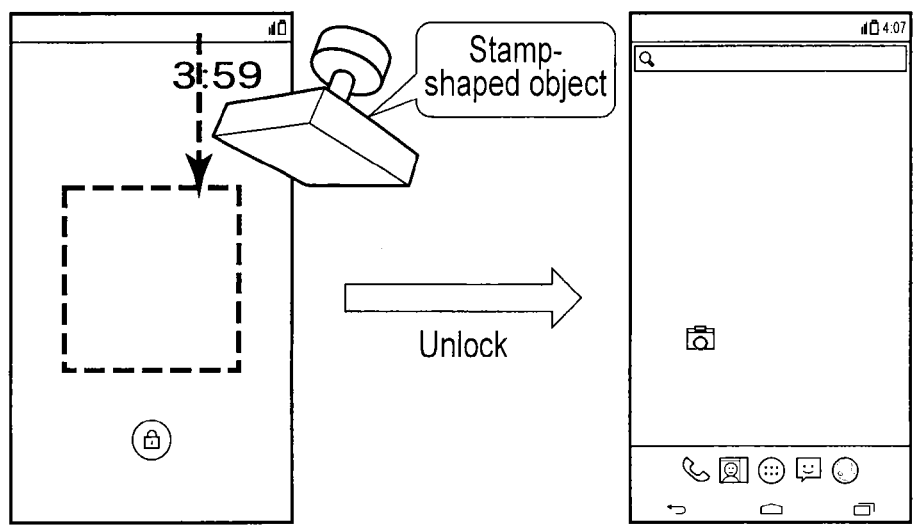
FIG. 15 is an operation diagram for explaining an example (example 4) of using the mobile apparatus according to the embodiment.

FIG. 15 shows an example of preliminarily registering image data on a specific shape and using the image data as a pattern for authentication of the unlocking. For example, by preliminarily registering image data on a specific shape such as a stamp, authentication processing of the unlocking using a stamp image of this shape can be performed.

FIG. 16 shows an example of preliminarily registering image data of several frames and using the image data as a gesture. For example, releasing the lock when an upward swipe with the tip of the index finger is performed, and sending the apparatus to sleep when a downward swipe is performed can be executed.

As applications of the function shown in FIG. 16, various types of function switching and function selection, for example, music selection operation in a direction of a previous tune and in a direction of a next tune according to an operation direction, start and stop of a music player, etc., can be performed. These operations do not need to be performed in a state in which a finger serving as a conductor touches the sensor surface. The operations can be performed above the sensor surface without contact (for example, outside a bag) by adjusting a sensing level of the sensor surface so as to enable sensing by 3-D image data based on raw data (RAW-D).

Therefore, the application operation device 300 (processing module) is used as a biometric authentication processing module. The biometric authentication processing module executes biometric authentication based on physical characteristics and behavioral characteristics of an operator who operates above the sensor surface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a sensor-integrated display device integrally comprising a display surface configured to output display information and a sensor surface configured to input operation information, wherein the sensor surface senses three-dimensional data which is an analog signal containing coordinates and a capacitance value;
a data transfer device configured to generate and output three-dimensional information which is a digital signal by digitizing the three-dimensional data sensed at the sensor surface; and
an application operation device comprising an image data generation module configured to generate three-dimensional image data at a plurality of sensing points on the sensor surface based on the three-dimensional information output by the data transfer device and a processing module configured to analyze an operation content of a conductor above the sensor surface based on the image data generated by the image data generation module,
wherein
the sensor-integrated display device comprises an array substrate including a common electrode, and a countersubstrate opposed to the array substrate and including a sensor detection electrode on the sensor surface,
the data transfer device is configured to supply a common voltage to the common electrode in a display period for outputting the display information, and to supply a sensor drive signal to the common electrode and detect a sensor signal output from the sensor detection electrode in a blanking period, the data transfer device includes a sensor signal detector configured to slice the analog signal, perform noise reduction for the sliced signal, and generate the noise-reduced raw read image data as the three-dimensional information, the sensor signal detector including a timing controller, an integration circuit, a sample-and-hold and analog-to-digital converter, and a digital filter, the data transfer device is configured to transfer the three-dimensional information to the image data generation module in synchronization with display drive timing for displaying the display information on the display surface, the data transfer device further includes a timing circuit and a digital-to-analog converter configured to output display data to the sensor-integrated display device and to output a blanking detection signal to the timing controller according to the display data supplied from the application operation device, and the timing controller is configured to execute varying frequencies of access pulses output to the sensor detection electrode and to set output timing on the access pulses with a signal from the application operation device, is configured to supply a reset timing signal to the integration circuit, and is configured to supply a clock to the sample-and-hold and analog-to-digital converter and the digital filter.

2. The apparatus according to claim 1, wherein the three-dimensional information is operation information indicating proximity of the conductor to the sensor surface.

3. The apparatus according to claim 1, further comprising a coordinate processing module, wherein each of the image data generation module and the coordinate processing module is configured to enable processing of multiple types of applications and is provided in an application operation device formed of a semiconductor integrated circuit comprising a baseband engine.

4. The apparatus according to claim 1, wherein the image data generation module generates the image data based on the three-dimensional information on all of the sensing points on the sensor surface in synchronization with display drive timing for displaying the display information on the display surface.

5. The apparatus according to claim 1, wherein the processing module comprises application processing module configured to activate application processing associated with the analyzed operation content.

6. The apparatus according to claim 1, wherein the processing module comprises an operation input recognition processing module configured to recognize an image of a specific portion of a human body of an operator who operates above the sensor surface.

7. The apparatus according to claim 1, wherein the processing module comprises a biometric authentication processing module configured to execute biometric authentication based on at least one of physical characteristics and behavioral characteristics of an operator who operates above the sensor surface.

8. A method of controlling an electronic apparatus comprising a sensor-integrated display device integrally comprising a display surface configured to output display information and a sensor surface configured to input operation information, a data transfer device, and an application operation device, the sensor-integrated display device comprising an array substrate including a common electrode, and a countersubstrate opposed to the array substrate and including a sensor detection electrode on the sensor surface, the data transfer device comprising a sensor signal detector including a timing controller, an integration circuit, a sample-and-hold and analog-to-digital converter, and a digital filter, the method comprising:

sensing three-dimensional data which is an analog signal containing coordinates and a capacitance value at the sensor surface;

generating and acquiring three-dimensional information which is a digital signal by digitizing the three-dimensional data sensed at the sensor surface;

generating three-dimensional image data at a plurality of sensing points on the sensor surface based on the acquired three-dimensional information;

recognizing an operation content of a conductor above the sensor surface based on the generated three-dimensional image data;

controlling an application operation in accordance with the recognized operation content;

supplying a common voltage to the common electrode in a display period for outputting the display information, and supplying a sensor drive signal to the common electrode and detecting a sensor signal output from the sensor detection electrode in a blanking period;

outputting display data to the sensor-integrated display device and outputting a blanking detection signal to the timing controller according to the display data supplied from the application operation device; and executing varying frequencies of access pulses output to the sensor detection electrode and setting output timing on the access pulses with a signal from the application operation device, supplying a reset timing signal to the integration circuit, and supplying a clock to the sample-and-hold and analog-to-digital converter and the digital filter, wherein generating the three-dimensional information comprises slicing the analog signal and performing noise reduction for the sliced signal to produce noise-reduced raw read image data as the three-dimensional information, the three-dimensional information is operation information indicating proximity of the conductor to the sensor surface, and the three-dimensional information is acquired by block transfer synchronized with display drive timing for displaying the display information on the display surface.

* * * * *